(12) United States Patent
Vauhkonen et al.

(10) Patent No.: US 12,333,814 B2
(45) Date of Patent: Jun. 17, 2025

(54) SYSTEMS AND METHODS FOR UTILIZING IMAGES, COMPUTER VISION, AND EMPIRICAL DATA TO MEASURE POTENTIAL DAMAGE AT NETWORK SITES

(71) Applicant: Verizon Patent and Licensing Inc., Basking Ridge, NJ (US)

(72) Inventors: Mumtaz Hannah Bee Vauhkonen, Costa Mesa, CA (US); Lucas Saltz, Brookhaven, GA (US); Annie Y. Wong, Denver, CO (US); Sujata Walsh, West Windsor, NJ (US); Michael D. Hanson, Millington, NJ (US); Nilam Sharma, Savoy, IL (US); Allie K. Watfa, Champaign, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 411 days.

(21) Appl. No.: 18/057,444

(22) Filed: Nov. 21, 2022

(65) Prior Publication Data
US 2024/0169737 A1 May 23, 2024

(51) Int. Cl.
*G06K 9/00* (2022.01)
*G06V 10/762* (2022.01)
(Continued)

(52) U.S. Cl.
CPC ............ *G06V 20/52* (2022.01); *G06V 10/762* (2022.01); *G06V 10/764* (2022.01); *G06V 10/82* (2022.01)

(58) Field of Classification Search
CPC ........ G06V 10/82; G06V 20/10; G06V 20/17; G06V 10/22; G06V 10/764; G06V 10/25;
(Continued)

(56) References Cited

U.S. PATENT DOCUMENTS

| 11,432,170 | B1* | 8/2022 | Osinski | ................. H04W 24/04 |
| 2021/0184748 | A1* | 6/2021 | Luo | ..................... H04W 52/143 |

(Continued)

OTHER PUBLICATIONS

Y. Zhai et al., "AntennaNet: Antenna Parameters Measuring Network for Mobile Communication Base Station Using UAV," in IEEE Transactions on Instrumentation and Measurement, vol. 70, pp. 1-17, 2021, Art No. 5501817 (Year: 2021).*

(Continued)

*Primary Examiner* — Alex Kok S Liew

(57) ABSTRACT

A device may receive image data identifying images of a network device, and may receive environmental data, historical outage data, performance data, customer data, and historical weather data associated with the network device. The device may process the image data, with a first model, to identify objects of the network device and to generate classifications for the objects, and may process the objects, the classifications, and the environmental data, with a second model, to determine relationships between an environment of the network device and the objects. The device may process the objects, the classifications, the environmental data, the relationships, the historical outage data, the performance data, the customer data, and the historical weather data, with a third model, to predict a probability of damage to the network device or maintenance issues for the network device, and may perform actions based on the probability of damage and/or the maintenance issues.

20 Claims, 9 Drawing Sheets

(51) Int. Cl.
  *G06V 10/764*    (2022.01)
  *G06V 10/82*     (2022.01)
  *G06V 20/52*     (2022.01)

(58) Field of Classification Search
  CPC ...... G06V 20/00; G06V 20/176; G06V 20/70; G06V 40/16; G06V 10/94; G06V 20/52; G06V 20/586; G06V 20/588; G06V 20/625; H04W 16/28; H04W 16/18; H04W 4/023; H04W 72/51; H04W 72/54; H04W 36/322; H04W 4/029; H04W 52/0229; H04W 52/0235; H04W 84/12; H04W 24/04
  See application file for complete search history.

(56) References Cited

U.S. PATENT DOCUMENTS

2022/0172475 A1* 6/2022 Hayman ................. G06T 17/05
2022/0322104 A1* 10/2022 Bender ................. H04W 16/18

OTHER PUBLICATIONS

Nex, F.; Duarte, D.; Tonolo, F.G.; Kerle, N. Structural Building Damage Detection with Deep Learning: Assessment of a State-of-the-Art CNN in Operational Conditions. Remote Sens. 2019 (Year: 2019).*

* cited by examiner

SYSTEMS AND METHODS FOR UTILIZING IMAGES, COMPUTER VISION, AND EMPIRICAL DATA TO MEASURE POTENTIAL DAMAGE AT NETWORK SITES

BACKGROUND

A network provider (e.g., a telecommunications provider) may build and maintain a large network that requires expansive infrastructure facilities with various types of network devices (e.g., cell towers, cell sites, and/or the like).

DETAILED DESCRIPTION OF EXAMPLE EMBODIMENTS

Figure 1A:
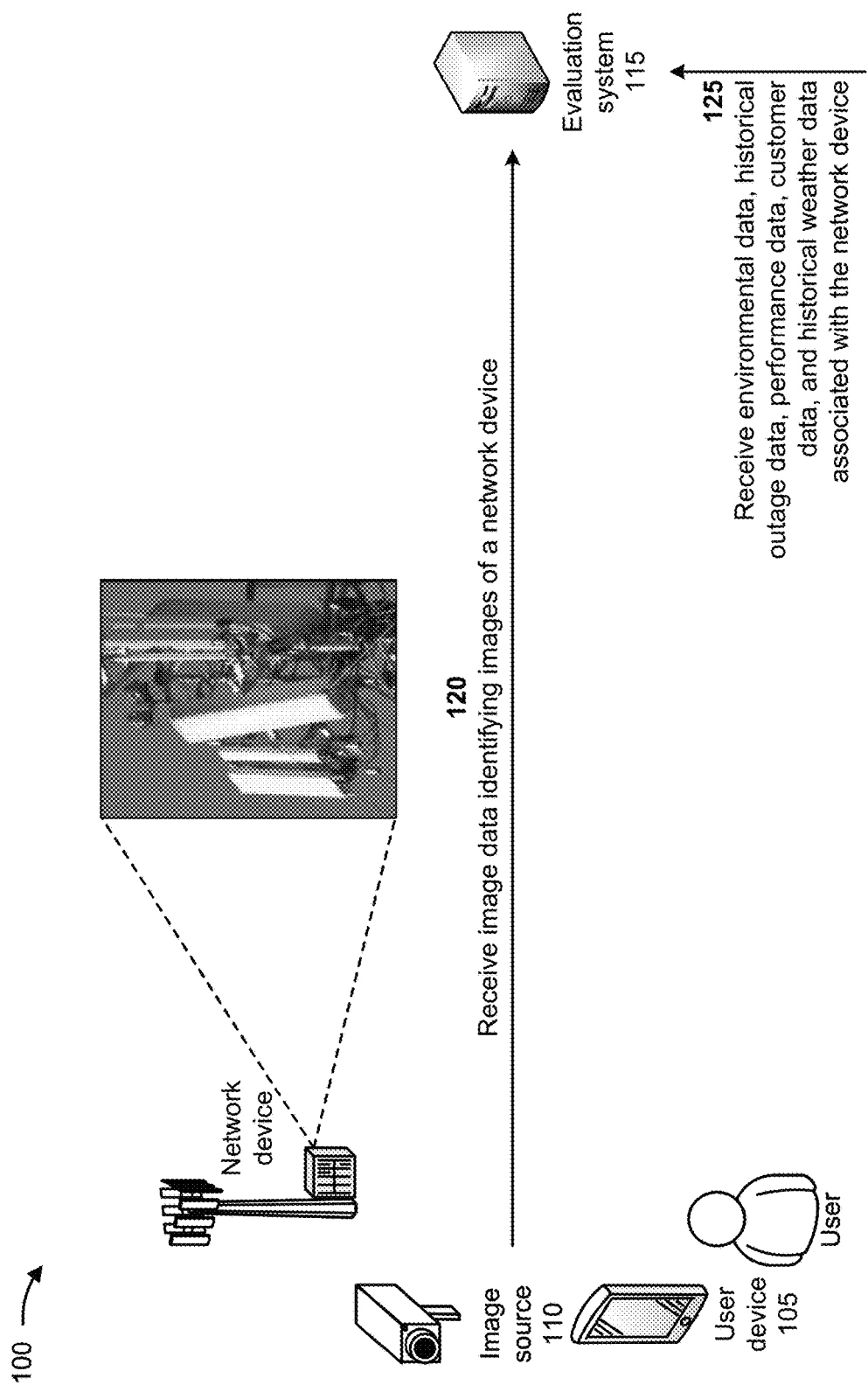
FIGS. 1A-1E are diagrams of an example implementation described herein.

The following detailed description of example implementations refers to the accompanying drawings. The same reference numbers in different drawings may identify the same or similar elements.

Maintaining and operating a network involves operational logistics with service and supply chain aspects. In addition to regular wear-and-tear maintenance of network devices, a network may be subject to hundreds of extreme weather events each year, resulting in a significant impact that requires operational response from support technicians. For example, a network may include thousands of wireless sites (e.g., cell towers, small cell stations, and/or the like) with central offices, equipment cabinets, points of presence, remote terminals, collocations, and/or the like. Maintaining such network devices requires the network provider to dispatch service technicians to the network devices for observation and maintenance of the network device. However, many times network devices may be operating correctly and not require maintenance, resulting in wasted time and resources of the service technicians. In some cases, however, network devices may not be operating correctly or at all, and service technicians may be dispatched in emergencies when the network devices become nonoperational due to fire, weather, environmental factors, and/or the like. Such situations result in lost network connectivity for customers and poor user experiences.

Therefore, current techniques for maintaining network devices consume computing resources (e.g., processing resources, memory resources, communication resources, and/or the like), networking resources, transportation resources, and/or the like associated with dispatching service technicians to network devices that do not require maintenance, failing to properly maintain network devices, handling damaged or nonoperational network devices that create lost network connectivity, scheduling technicians to maintain network devices that do not require maintenance, and/or the like.

Some implementations described herein relate to an evaluation system that utilizes images, computer vision, and empirical data to measure potential damage at network sites. For example, the evaluation system may receive image data identifying images of a network device, and may receive environmental data, historical outage data, performance data, customer data, and historical weather data associated with the network device. The evaluation system may process the image data, with an object detection and classification model, to identify objects of the network device and to generate classifications for the objects, and may process the objects, the classifications, and the environmental data, with a geospatial decoder model, to determine relationships between an environment of the network device and the objects. The evaluation system may process the objects, the classifications, the environmental data, the relationships, the historical outage data, the performance data, the customer data, and the historical weather data, with a predictive model, to predict a probability of damage to the network device or maintenance issues for the network device. The evaluation system may perform one or more actions based on the probability of damage and/or the maintenance issues, such as providing the probability of damage and/or the maintenance issues for display, dispatch a technician or an autonomous vehicle to replace or repair the network device, cause another network device to provide service while the network device is repaired, and/or the like.

In this way, the evaluation system utilizes images, computer vision, and empirical data to measure potential damage at network sites. The evaluation system may provide a solution based on machine learning and computer vision, the solution utilizing imagery as input, in conjunction with other structured and unstructured data (e.g., geographic locations, network traffic, population, tower height, equipment, past failures, and/or the like), to determine a degree of damage to a network device. The evaluation system may utilize predictive and prescriptive analytics to plan for, and respond to, regular maintenance of network devices, as well as extreme events in the future. This, in turn, conserves computing resources, networking resources, transportation resources, and/or the like that would otherwise have been consumed in dispatching service technicians to network devices that do not require maintenance, failing to properly maintain network devices, handling damaged or nonoperational network devices that create lost network connectivity, scheduling technicians to maintain network devices that do not require maintenance, and/or the like.

In some implementations, a magnitude of infrastructure sites, diverse locations, and varying density of network equipment may enable the evaluation system to receive multiple types of data, including environmental conditions, past history of conditions, historical damage, and/or the like. By computing correlations across a large set of imagery and historical data, the evaluation system may quickly and easily identify regular wear and tear of network devices, network devices located in heavily wooded areas with debris, network devices with high density of equipment, network devices located with obstructions or with physical objects that may cause damage, network devices located in locations with severe weather conditions, and/or the like.

FIGS. 1A-1E are diagrams of an example 100 associated with utilizing images, computer vision, and empirical data to measure potential damage at network sites. As shown in FIGS. 1A-1E, example 100 includes a user device 105 (e.g., associated with a user) and an image source 110 associated with a network device and an evaluation system 115. The evaluation system 115 may include a system that utilizes images, computer vision, and empirical data to measure potential damage at network sites. The network device may support, for example, a cellular radio access technology (RAT) and may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication.

Further details of the user device 105, the image source 110, and the evaluation system 115 are provided elsewhere herein. Although the figures depict a single user device 105 and image source 110, in some implementations, fewer or more user devices 105 and/or image sources 110 may be associated with the evaluation system 115 and may be deployed at various locations near the network device. Although the evaluation system 115 is described as being a cloud computing system, in some implementations, functions of the evaluation system 115 may be performed by an unmanned aerial vehicle (UAV), an autonomous vehicle, a multi-access edge computing (MEC) device, and/or the like.

As shown in FIG. 1A, and by reference number 120, the evaluation system 115 may receive image data identifying images of a network device. For example, the evaluation system 115 may receive the image data from the user device 105, the image source 110, and/or the like. The image source 110 may include a UAV (e.g., equipped with a camera), a camera, a camera of a user device, a dash camera of a vehicle, an image repository, a satellite, and/or the like. The image data may include images that identify the network device (e.g., a base station, a utility pole, and/or the like). In some implementations, the image data may include high-definition image data, in multimodal formats, that are captured by the image source 110 (e.g., a UAV with a preset flight path), red, green, blue (RGB) satellite imagery data, light detection and ranging (LIDAR) imagery data, ultrasound based image data, image data captured with mobile devices equipped with geo-sensing cameras, and/or the like. The evaluation system 115 may continuously receive the image data from the image source 110, may periodically receive the image data from the image source 110, may receive the image data from the image source 110 based on requesting the image data from the image source 110, and/or the like. In some implementations, the evaluation system 115 may store the image data in a data structure (e.g., a database, a table, a list, and/or the like).

As further shown in FIG. 1A, and by reference number 125, the evaluation system 115 may receive environmental data, historical outage data, performance data, customer data, and historical weather data associated with the network device. For example, a network control system may manage the network device and may collect the environmental data, the historical outage data, the performance data, and the customer data for the network device over time. The evaluation system 115 may receive the environmental data, the historical outage data, the performance data, and the customer data from the network control system. In some implementations, the evaluation system 115 may continuously receive the environmental data, the historical outage data, the performance data, and the customer data from the network control system, may periodically receive the environmental data, the historical outage data, the performance data, and the customer data from the network control system, may receive the environmental data, the historical outage data, the performance data, and the customer data from the network control system based on a request provided to the network control system, and/or the like. The evaluation system 115 may continuously receive the historical weather data from a weather source (e.g., a weather agency), may periodically receive the historical weather data from the weather source, and/or may receive the historical weather data from the weather source based on providing a request to the weather source.

The environmental data may include data identifying an environment of the network device, environmental factors associated with the network device, a height of the network device, heights of components of the network device, a geolocation of the network device, available space on attachment structures of the network device, and/or the like. The historical outage data may include historical data identifying previous outages associated with the network device, causes of the previous outages, modifications made to the network device to stop the previous outages, and/or the like. The performance data may include data identifying the performance of the network device (e.g., latency data, throughput data, bandwidth data, jitter data, error rate data, and/or the like), improvements in the performance of the network device, reductions in performance of the network device, causes of the performance of the network device, a make and model of the network device, a vendor of the network device, and/or the like. The customer data may include data identifying a customer experience (e.g., a quality of service (QoS)) provided by the network device to customers utilizing the network device. The historical weather data may include historical data identifying weather events at a location of the network device over time.

Figure 1B:
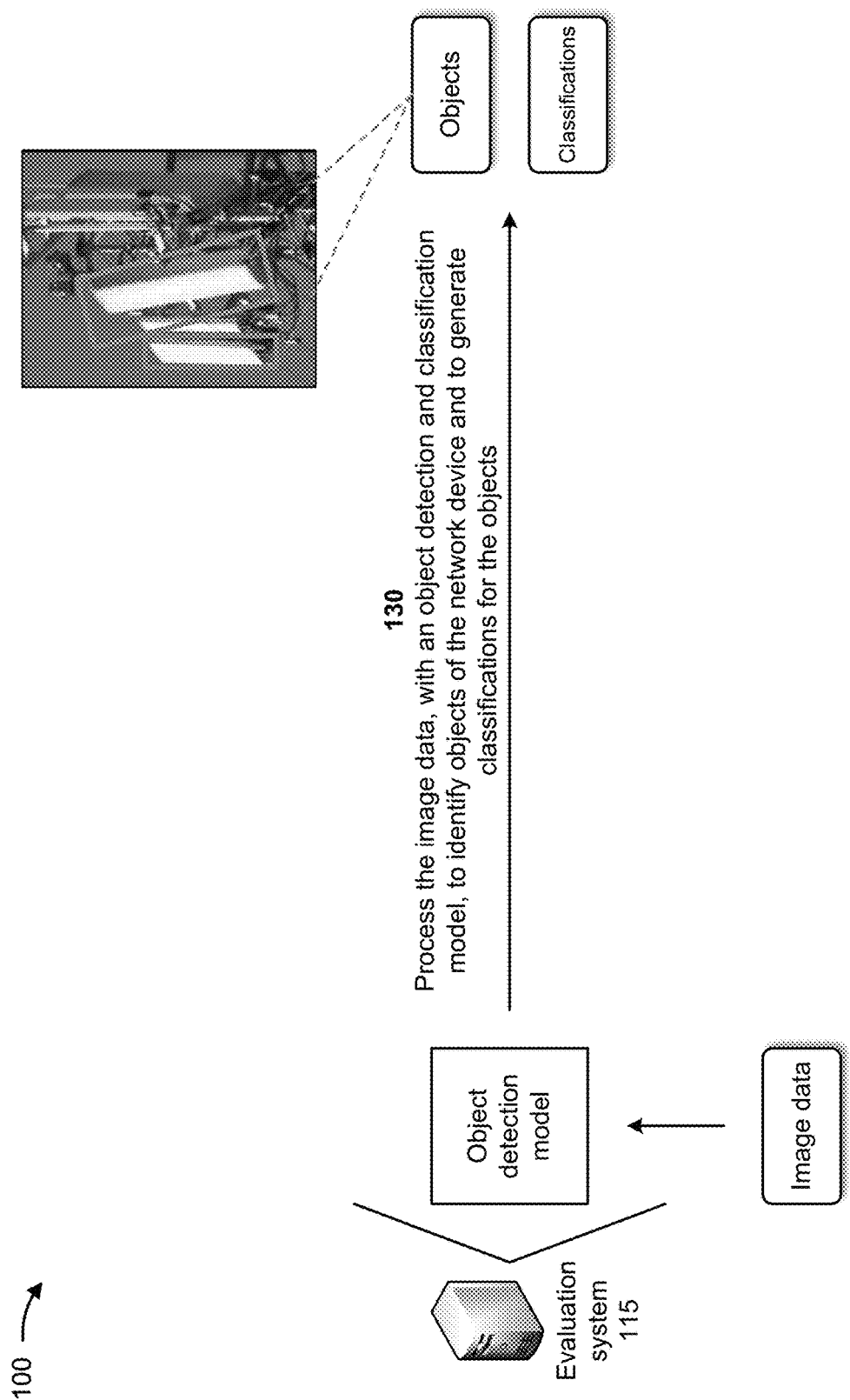

As shown in FIG. 1B, and by reference number 130, the evaluation system 115 may process the image data, with an object detection and classification model, to identify objects of the network device and to generate classifications for the objects. For example, the evaluation system 115 may include or be associated with an object detection and classification model, such as a computer vision model. Computer vision is an area of machine learning dedicated to interpreting and understanding images and video. A computer vision model may identify and utilize visual information to perform visual tasks. A computer vision model may translate visual data based on features and contextual information identified during training. This enables the computer vision model to interpret images and video and apply those interpretations to predictive or decision making tasks. Further details of training the object detection and classification model are provided below in connection with FIG. 2.

In some implementations, the evaluation system 115 may process the image data, with the object detection and classification model, to identify objects of the network device. For example, the object detection and classification model may identify objects, such as components of the network device, infrastructure of the network device, connections of the network device, vegetation around the network device, obstructions associated with the network device, and/or the like. The evaluation system 115 may also process the image data, with the object detection and classification model, to generate classifications for the objects. For example, the object detection and classification model may generate classifications, such as a component classification, an infrastructure classification, a connection classification, a vegetation classification, an obstruction classification, and/or the like.

In some implementations, when processing the image data, with the object detection and classification model, to identify the objects of the network device and to generate the classifications for the objects, the evaluation system 115 may process the image data, with the object detection and classification model, to identify attributes associated with the objects, and may generate insights about the objects based on the attributes. The evaluation system 115 may provide the insights to a geospatial decoder model, along with the objects, the classifications, and the environmental data, as described below.

Figure 1C:
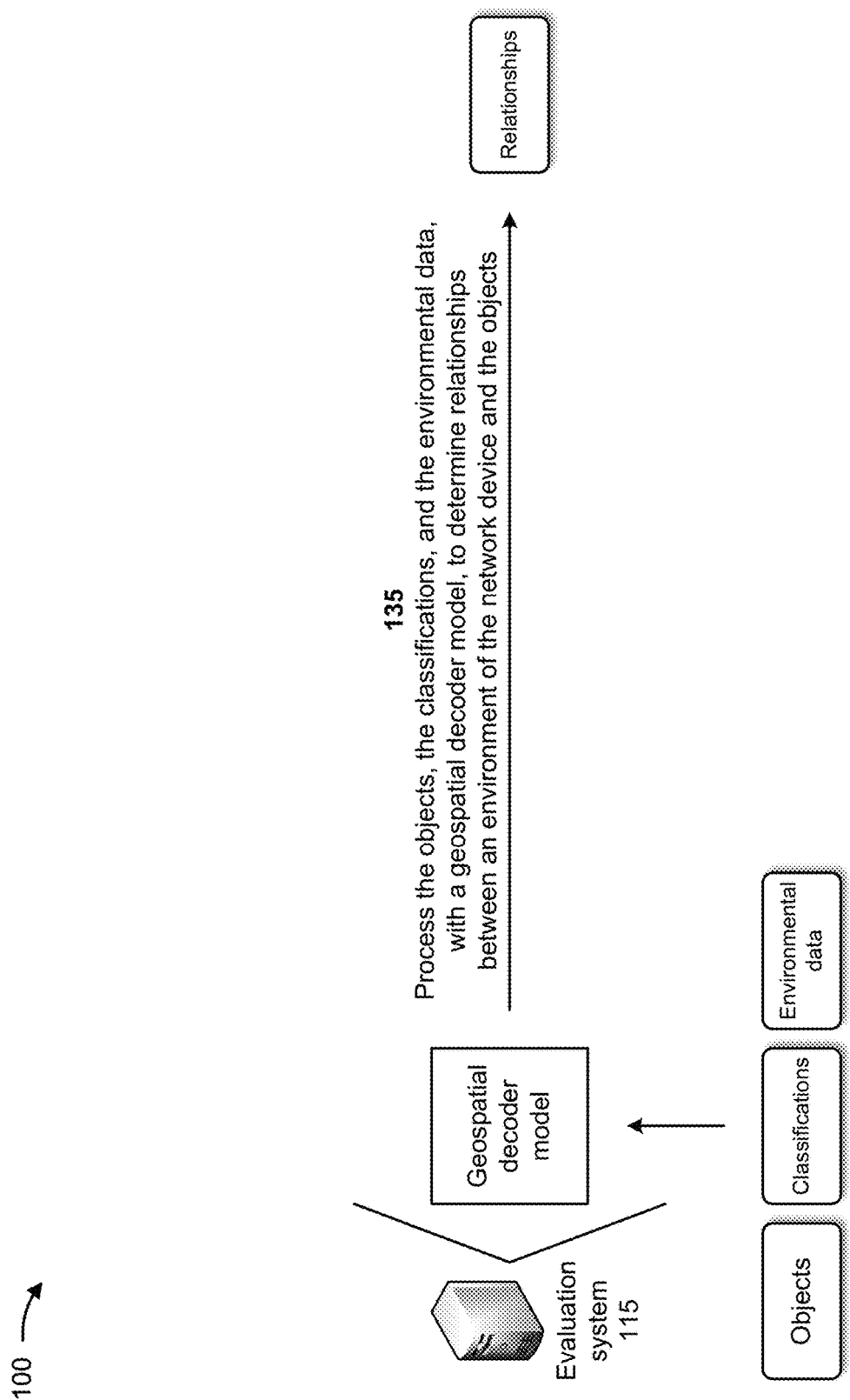

As shown in FIG. 1C, and by reference number 135, the evaluation system 115 may process the objects, the classifications, and the environmental data, with a geospatial decoder model, to determine relationships between an environment of the network device and the objects. For example, the evaluation system 115 may include or be associated with a geospatial decoder model, such as an encoder-decoder convolutional neural network (CNN) model. An encoder-decoder CNN model may include is an encoder neural network and a decoder neural network in which one or both are convolutional neural networks. The encoder may receive a variable-length sequence as input, and the decoder may act as a conditional language model that receives encoded input and context of target sequence and predicts a subsequent token in the target sequence. Further details of training the geospatial decoder model are provided below in connection with FIG. 2.

In some implementations, the evaluation system 115 may process the objects, the classifications, and the environmental data, with the geospatial decoder model, to determine relationships between the environment of the network device and the objects. For example, the geospatial decoder model may determine relationships, such as a relationship between vegetation and the objects, a relationship between dimensions of the network device and the objects, a relationship between weather conditions and the objects, a relationship between a geolocation of the network device and the objects, and/or the like.

Figure 1D:
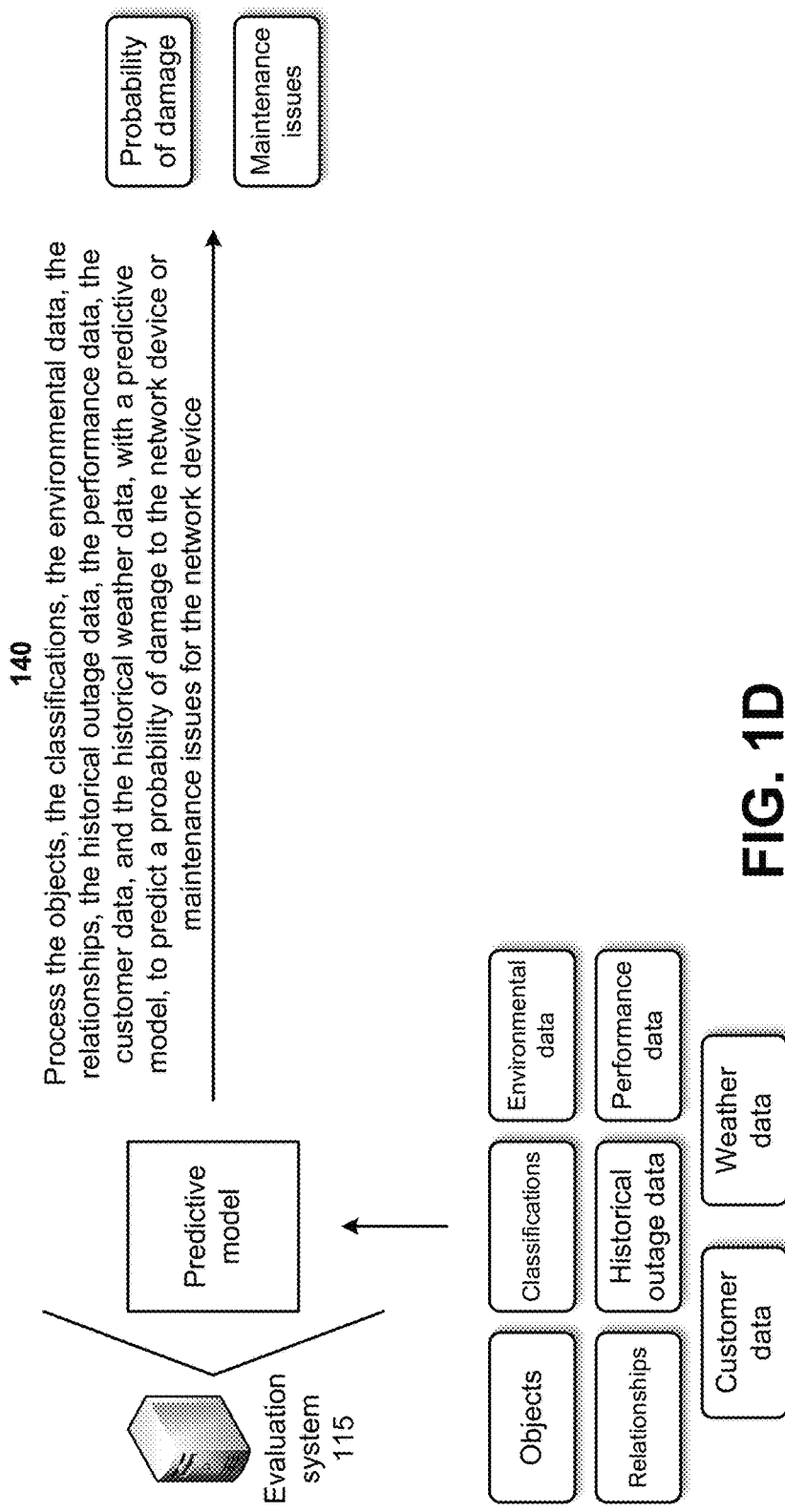

As shown in FIG. 1D, and by reference number 140, the evaluation system 115 may process the objects, the classifications, the environmental data, the relationships, the historical outage data, the performance data, the customer data, and the historical weather data, with a predictive model, to predict a probability of damage to the network device or maintenance issues for the network device. For example, the evaluation system 115 may include or be associated with a predictive model, such as a clustering machine learning model or clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space, and/or the like). Further details of training the predictive model are provided below in connection with FIG. 2.

In some implementations, the evaluation system 115 may process the objects, the classifications, the relationships, and one or more of the environmental data, the historical outage data, the performance data, the customer data, or the historical weather data, with the predictive model, to predict the probability of damage to the network device or the maintenance issues for the network device. For example, the predictive model may predict different types of damage to the network device, such as missing parts of the network device, a severed cable of the network device, a fire, obstructions to the network device, a bent component of the network device, excessive snow or ice on the network device, a misorientation of the network device, and/or the like. The predictive model may also predict the probability of such different types of damage occurring to the network device. The predictive model may predict the maintenance issues for the network device, such as replacing worn components, reorienting the network device, reorienting components of the network device, trimming vegetation around the network device, removing snow or ice from the network device, and/or the like. In some implementations, the predictive model may determine an extent of damage to the network device and/or one or more components of the network device, types of maintenance required for the network device, potential damage to the network device and/or one or more components of the network device in future, and/or the like.

In some implementations, when processing the objects, the classifications, the environmental data, the relationships, the historical outage data, the performance data, the customer data, and the historical weather data, with the predictive model, to predict the probability of damage to the network device or the maintenance issues for the network device, the evaluation system 115 may process the objects, the classifications, the environmental data, the relationships, the historical outage data, the performance data, the customer data, and the historical weather data, with the predictive model, to predict probabilities of damage to the objects or maintenance issues for the objects. The evaluation system 115 may combine the probabilities of damage to the objects to generate the probability of damage to the network device, and may combine the maintenance issues for the objects to generate the maintenance issues for the network device.

Figure 1E:
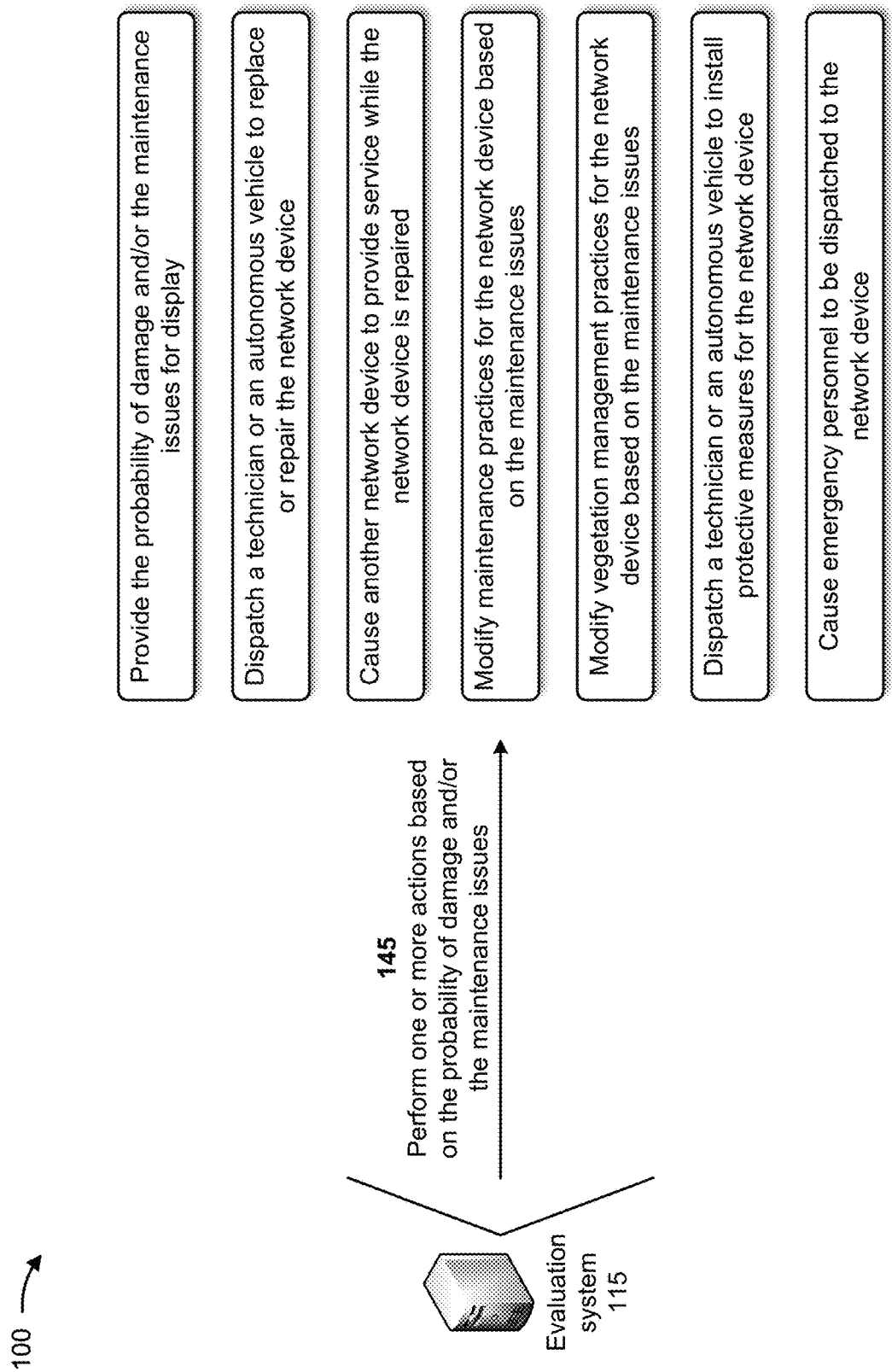

As shown in FIG. 1E, and by reference number 145, the evaluation system 115 may perform one or more actions based on the probability of damage and/or the maintenance issues. In some implementations, performing the one or more actions includes the evaluation system 115 providing the probability of damage and/or the maintenance issues for display. For example, the evaluation system 115 may generate a user interface that includes the probability of damage and/or the maintenance issues, and may provide the user interface to the user device 105. The user device 105 may display the user interface, with the probability of damage and/or the maintenance issues, to the user of the user device 105. The user may utilize this information to take action that reduces the probability of damage to the network device and/or handles the maintenance issues for the network device. In this way, the evaluation system 115 conserves computing resources, networking resources, transportation resources, and/or the like that would otherwise have been consumed in failing to properly maintain the network device.

In some implementations, performing the one or more actions includes the evaluation system 115 dispatching a technician or an autonomous vehicle to replace or repair the network device. For example, based on the probability of damage and/or the maintenance issues, the evaluation system 115 may cause a technician or an autonomous vehicle (e.g., a robot, a UAV, and/or the like) to be dispatched to replace or repair the network and/or to perform maintenance on the network device. The technician or the autonomous vehicle may travel to the network device and may perform the replacement, the repair, and/or the maintenance on the network device. In this way, the evaluation system 115 conserves computing resources, networking resources, transportation resources, and/or the like that would otherwise have been consumed in dispatching service technicians to network devices that do not require maintenance.

In some implementations, performing the one or more actions includes the evaluation system 115 causing another network device to provide service while the network device is repaired. For example, based on the probability of damage and/or the maintenance issues, the evaluation system 115 may determine that the network device needs to be taken offline and repaired. The evaluation system 115 may cause another network device (e.g., a mobile network device) to provide service while the network device is repaired, to prevent any disruption in service. In this way, the evaluation system 115 conserves computing resources, networking resources, transportation resources, and/or the like that would otherwise have been consumed in handling damaged or nonoperational network devices that create lost network connectivity.

In some implementations, performing the one or more actions includes the evaluation system 115 modifying maintenance practices for the network device based on the maintenance issues. For example, based on the maintenance issues, the evaluation system 115 may determine that the network device needs to be provided maintenance more frequently. The evaluation system 115 may update the scheduling of technicians or autonomous vehicles for performing maintenance on the network device so that the network device is provided maintenance more frequently. In this way, the evaluation system 115 conserves computing resources, networking resources, transportation resources, and/or the like that would otherwise have been consumed in scheduling technicians to maintain network devices that do not require maintenance.

In some implementations, performing the one or more actions includes the evaluation system 115 modifying vegetation management practices for the network device based on the maintenance issues. For example, based on the maintenance issues, the evaluation system 115 may determine that vegetation around the network device needs to be pruned more frequently. The evaluation system 115 may update the scheduling of workers for pruning the vegetation around the network device so that the vegetation is pruned more frequently and does not interfere with operation of the network device. In this way, the evaluation system 115 conserves computing resources, networking resources, transportation resources, and/or the like that would otherwise have been consumed in scheduling workers to prune vegetation around network devices that do not require maintenance.

In some implementations, performing the one or more actions includes the evaluation system 115 dispatching a technician or an autonomous vehicle to install protective measures for the network device. For example, based on the probability of damage and/or the maintenance issues, the evaluation system 115 may determine that a component of the network device requires protection (e.g., a shield) from weather (e.g., wind and rain) associated with the network device. The evaluation system 115 may dispatch a technician or an autonomous vehicle to install the shield on the component of the network device. In this way, the evaluation system 115 conserves computing resources, networking resources, transportation resources, and/or the like that would otherwise have been consumed in handling damaged or nonoperational network devices that create lost network connectivity.

In some implementations, performing the one or more actions includes the evaluation system 115 causing emergency personnel to be dispatched to the network device. For example, if the evaluation system 115 detects a fire at network device, the evaluation system 115 may cause a fire department to be dispatched to the network device so that the fire may be extinguished without further damaging the network device. In this way, the evaluation system 115 conserves computing resources, networking resources, transportation resources, and/or the like that would otherwise have been consumed in handling damaged or nonoperational network devices that create lost network connectivity.

In some implementations, the evaluation system 115 may perform other actions based on the probability of damage and/or the maintenance issues. For example, the evaluation system 115 may retrain one or more of the object detection and classification model, the geospatial decoder model, or the predictive model based on the probability of damage and/or the maintenance issues. The evaluation system 115 may recommend locations for further network hardening and redundancy based on the probability of damage and/or the maintenance issues; may recommend locations for temporary network devices in advance of extreme weather events and/or outages; may repurpose a location of a network device for other network equipment; may identify gaps in network device inventory; and/or the like.

In this way, the evaluation system 115 may utilize machine learning models to automatically identify damage to network devices and to provide valuable insights that may reduce costs of repairs and maintenance and may predict future damage. By combining outputs of the computer vision model with other multimodal data (e.g., about infrastructure, location, network traffic, network coverage, and/or the like), the evaluation system 115 may provide analytical insights for determining a plan for repair and maintenance. The evaluation system 115 may enable prioritization of funding for maintenance based on a degree of damage and a potential for damage to a network device.

In this way, the evaluation system 115 utilizes images, computer vision, and empirical data to measure potential damage at network sites. The evaluation system 115 may provide a machine learning-based computer vision solution that utilizes imagery as input, in conjunction with other structured and unstructured data (e.g., geographic locations, network traffic, population, tower height, equipment, past failures, and/or the like), to a degree of damage to a network device. The evaluation system 115 may utilize predictive and prescriptive analytics to plan for, and respond to, regular maintenance of network devices, as well as extreme events in the future. This, in turn, conserves computing resources, networking resources, transportation resources, and/or the like that would otherwise have been consumed in dispatching service technicians to network devices that do not require maintenance, failing to properly maintain network devices, handling damaged or nonoperational network devices that create lost network connectivity, scheduling technicians to maintain network devices that do not require maintenance, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
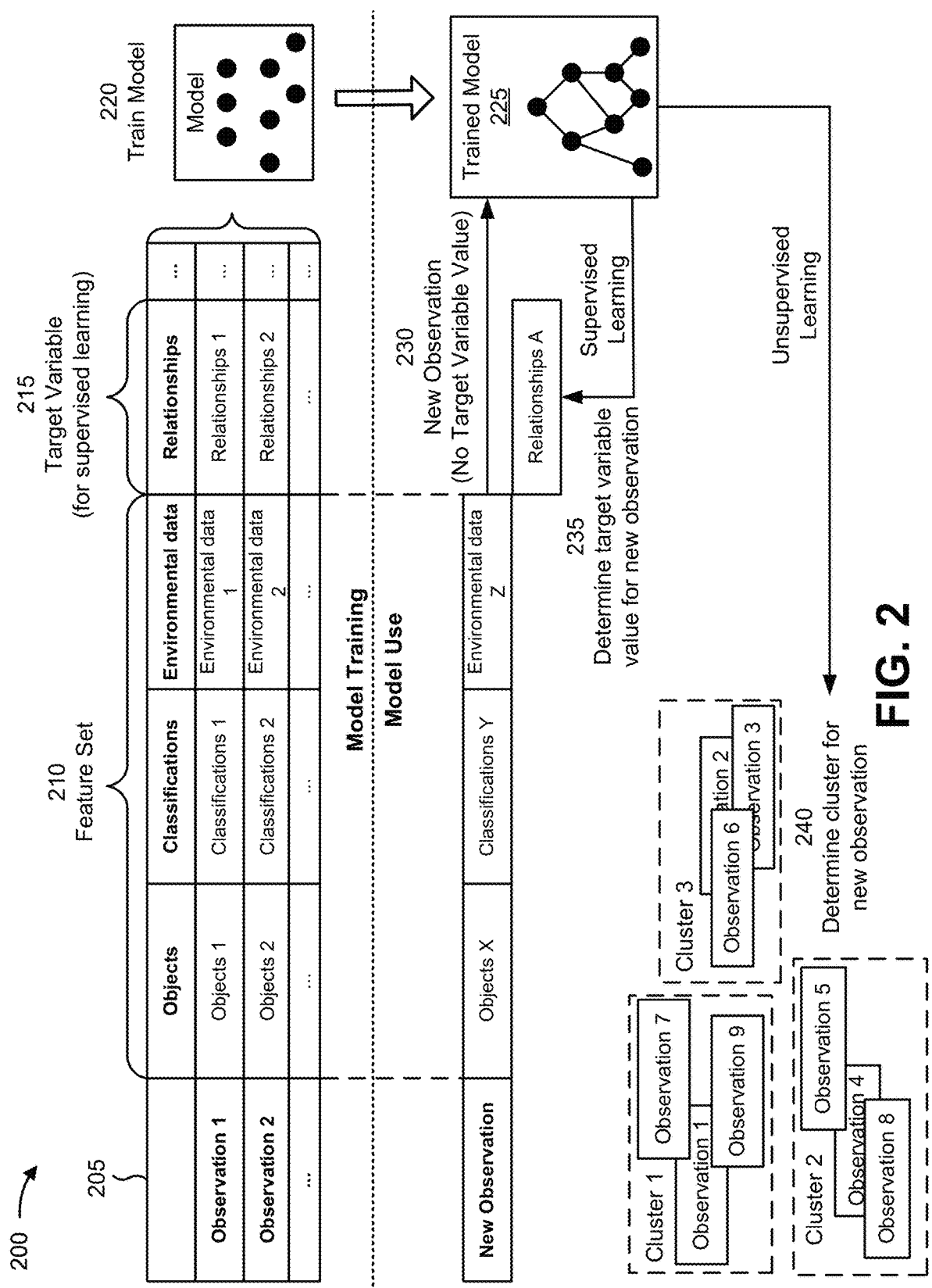
FIG. 2 is a diagram illustrating an example of training and using a machine learning model.

FIG. 2 is a diagram illustrating an example 200 of training and using a machine learning model for measuring potential damage at network sites. The machine learning model training and usage described herein may be performed using a machine learning system. The machine learning system may include or may be included in a computing device, a server, a cloud computing environment, and/or the like, such as the evaluation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the evaluation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the evaluation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of objects, a second feature of classifications, a third feature of environmental data, and so on. As shown, for a first observation, the first feature may have a value of objects 1, the second feature may have a value of classifications 1, the third feature may have a value of environmental data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "relationships" and may include a value of relationships 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of objects X, a second feature of classifications Y, a third feature of environmental data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of relationships A for the target variable of the relationships for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an objects cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a classifications cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to measure potential damage at network sites. The machine learning system enables recognition and/or identification of tens, hundreds, thousands, or millions of features and/or feature values for tens, hundreds, thousands, or millions of observations, thereby increasing accuracy and consistency and reducing delay associated with measuring potential damage at network sites relative to requiring computing resources to be allocated for tens, hundreds, or thousands of operators to manually measure potential damage at network sites.

As indicated above, FIG. 2 is provided as an example. Other examples may differ from what is described in connection with FIG. 2.

Figure 3:
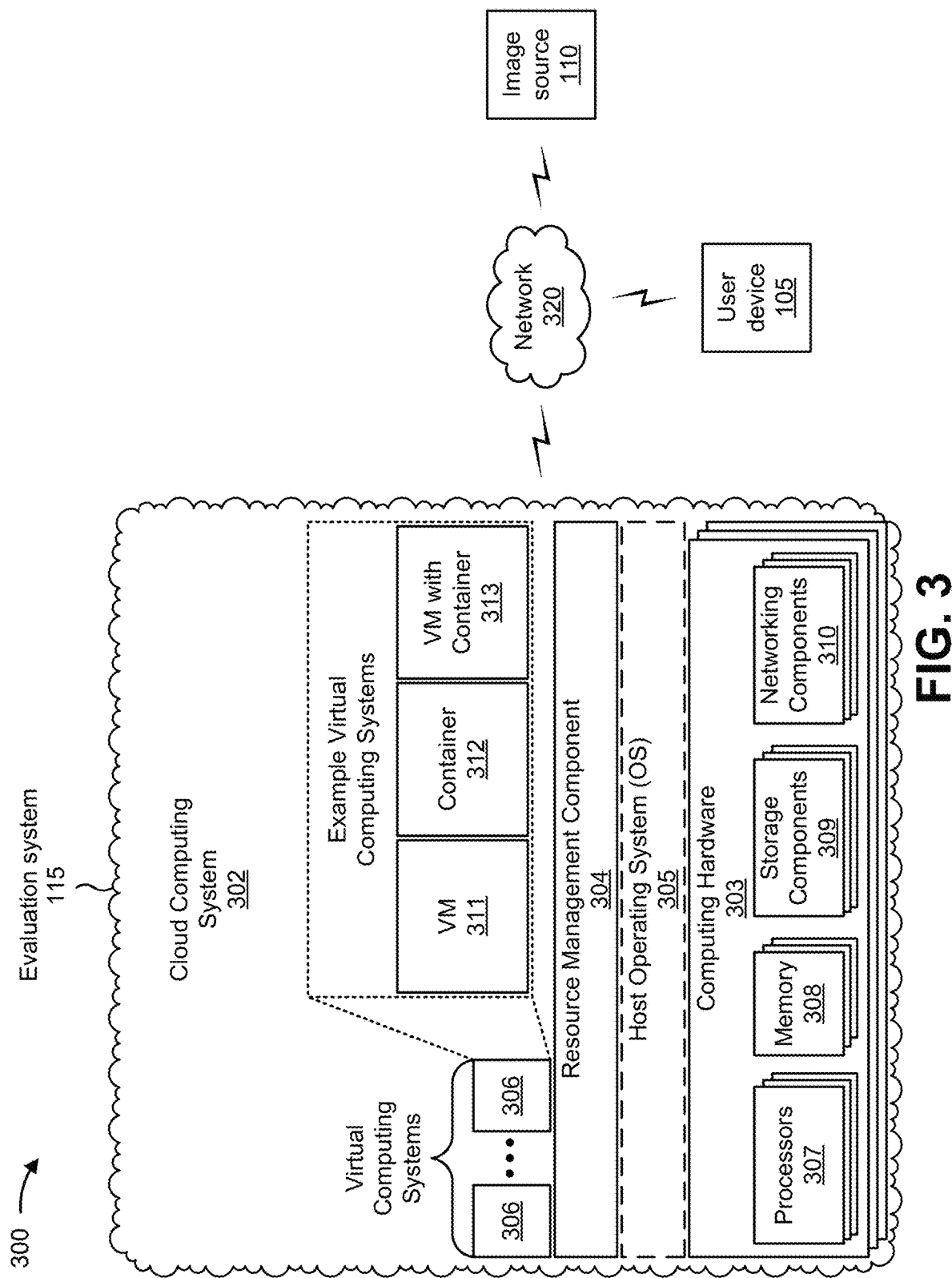
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include an evaluation system 115, which may include one or more elements of and/or may execute within a cloud computing system 302. The cloud computing system 302 may include one or more elements 303-313, as described in more detail below. As further shown in FIG. 3, the environment 300 may include the user device 105, the image source 110, and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The image source 110 may include one or more devices capable of receiving, generating, storing, processing, providing, and/or routing information, as described elsewhere herein. The image source 110 may include a communication device and/or a computing device. For example, the image source 110 may include an optical instrument that captures videos (e.g., images and audio). The image source 110 may feed real-time video directly to a screen or a computing device for immediate observation, may record the captured video (e.g., images and audio) to a storage device for archiving or further processing, and/or the like. The recorded video may be utilized for surveillance and monitoring tasks in which unattended recording of a situation is required for later analysis. In some implementations, the image source 110 may include a camera, a user device, a UAV, an autonomous vehicle, a dash camera, a satellite, a imagery data source, and/or the like.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the evaluation system 115 may include one or more elements 303-313 of the cloud computing system 302, may execute within the cloud computing system 302, and/or may be hosted within the cloud computing system 302, in some implementations, the evaluation system 115 may not be cloud-based (e.g., may be implemented outside of a cloud computing system) or may be partially cloud-based. For example, the evaluation system 115 may include one or more devices that are not part of the cloud computing system 302, such as device 400 of FIG. 4, which may include a standalone server or another type of computing device. The evaluation system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
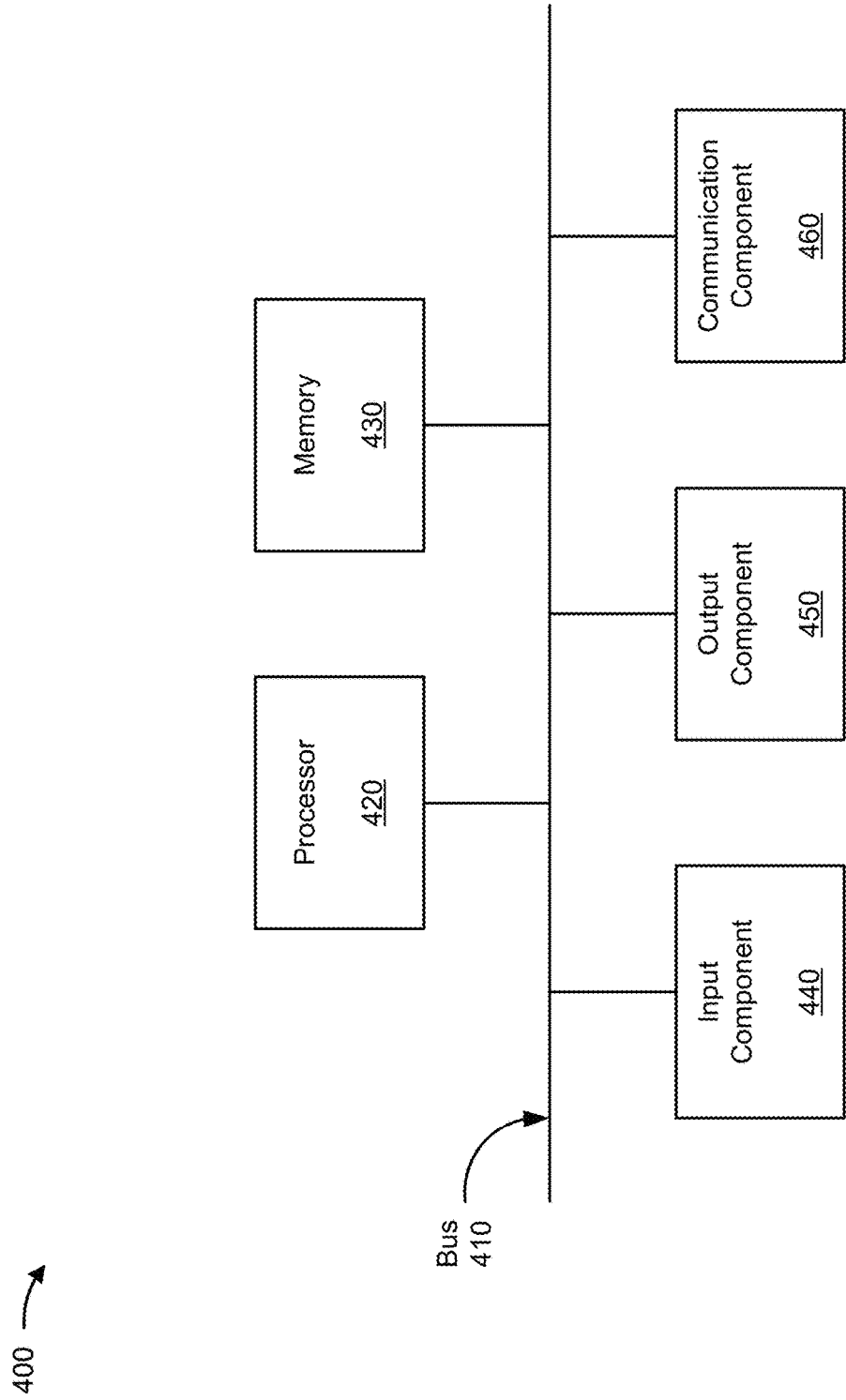
FIG. 4 is a diagram of example components of one or more devices of FIG. 3.

FIG. 4 is a diagram of example components of a device 400, which may correspond to the user device 105, the image source 110, and/or the evaluation system 115. In some implementations, the user device 105, the image source 110, and/or the evaluation system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
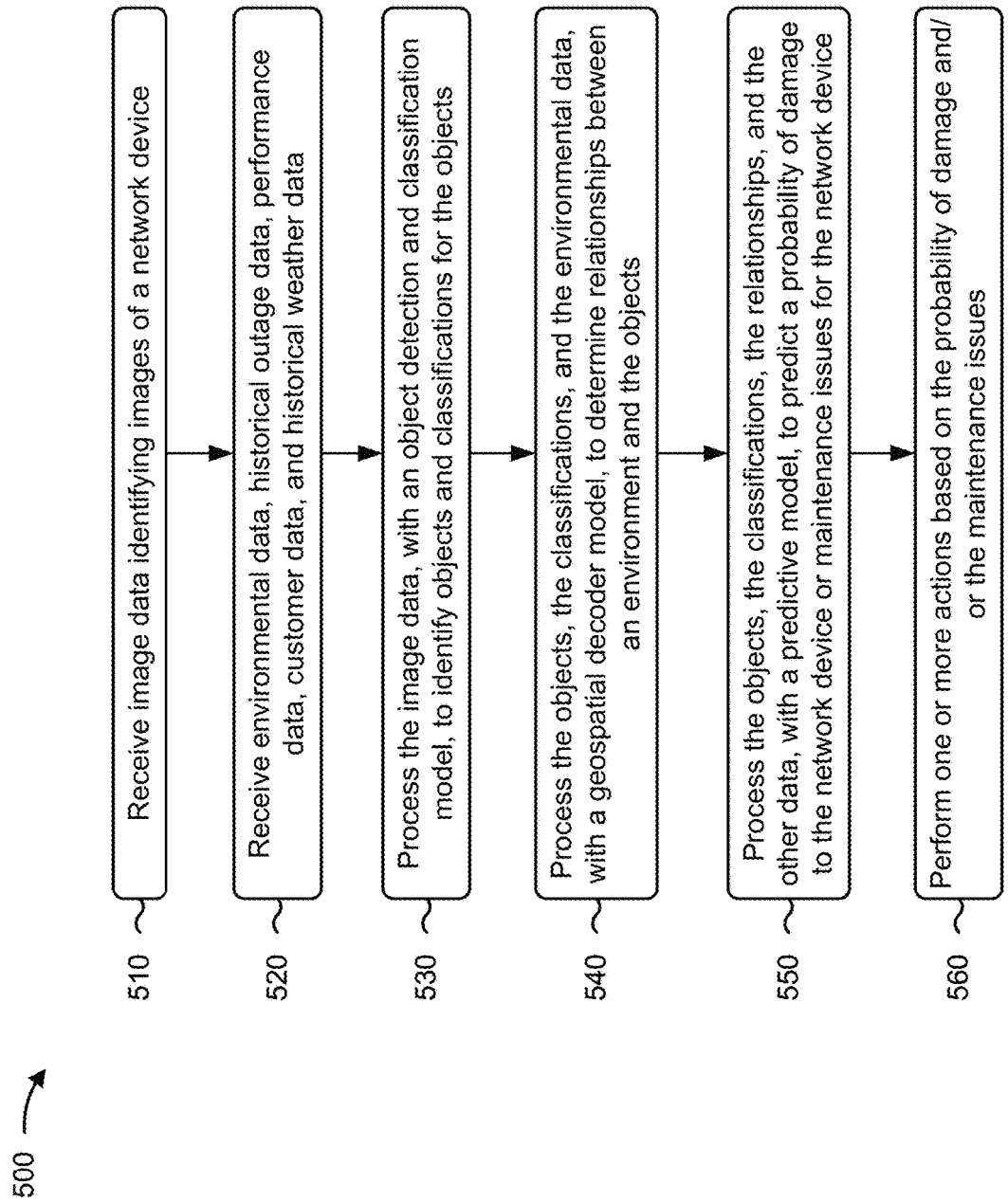
FIG. 5 is a flowchart of an example process for utilizing images, computer vision, and empirical data to measure potential damage at network sites.

FIG. 5 is a flowchart of an example process 500 for utilizing images, computer vision, and empirical data to measure potential damage at network sites. In some implementations, one or more process blocks of FIG. 5 may be performed by a device (e.g., the evaluation system 115). In some implementations, one or more process blocks of FIG. 5 may be performed by another device or a group of devices separate from or including the device, such as a user device (e.g., the user device 105) and/or an image source (e.g., the image source 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving image data identifying images of a network device (block 510). For example, the device may receive image data identifying images of a network device, as described above. In some implementations, the device includes one or more of a cloud-based device, an unmanned aerial vehicle, an autonomous vehicle, or a multi-access edge computing device. In some implementations, receiving the image data identifying the images of the network device includes receiving the image data from one or more of an unmanned aerial vehicle, a user device, a dash camera of a vehicle, an image repository, or a satellite.

As further shown in FIG. 5, process 500 may include receiving environmental data, historical outage data, performance data, customer data, and historical weather data (block 520). For example, the device may receive environmental data, historical outage data, performance data, customer data, and historical weather data associated with the network device, as described above.

As further shown in FIG. 5, process 500 may include processing the image data, with an object detection and classification model, to identify objects and classifications for the objects (block 530). For example, the device may process the image data, with an object detection and classification model, to identify objects of the network device and to generate classifications for the objects, as described above. In some implementations, the object detection and classification model includes a computer vision model. In some implementations, processing the image data, with the object detection and classification model, to identify the objects of the network device and to generate the classifications for the objects includes processing the image data, with the object detection and classification model, to identify attributes associated with the objects, generating insights about the objects based on the attributes, and providing the insights to the geospatial decoder model along with the objects, the classifications, and the environmental data.

As further shown in FIG. 5, process 500 may include processing the objects, the classifications, and the environmental data, with a geospatial decoder model, to determine relationships between an environment and the objects (block 540). For example, the device may process the objects, the classifications, and the environmental data, with a geospatial decoder model, to determine relationships between an environment of the network device and the objects, as described above. In some implementations, the relationships between the environment of the network device and the objects include one or more of a relationship between vegetation and the objects, a relationship between dimensions of the network device and the objects, a relationship between weather conditions and the objects, or a relationship between a geolocation of the network device and the objects. In some implementations, the geospatial decoder model includes an encoder-decoder convolutional neural network model.

As further shown in FIG. 5, process 500 may include processing the objects, the classifications, the relationships, and the other data, with a predictive model, to predict a probability of damage to the network device or maintenance issues for the network device (block 550). For example, the device may process the objects, the classifications, the environmental data, the relationships, the historical outage data, the performance data, the customer data, and the historical weather data, with a predictive model, to predict a probability of damage to the network device or maintenance issues for the network device, as described above.

In some implementations, the predictive model includes a clustering machine learning model. In some implementations, processing the objects, the classifications, the environmental data, the relationships, the historical outage data, the performance data, the customer data, and the historical weather data, with the predictive model, to predict the probability of damage to the network device or the maintenance issues for the network device includes processing the objects, the classifications, the environmental data, the relationships, the historical outage data, the performance data, the customer data, and the historical weather data, with the predictive model, to predict probabilities of damage to the objects or maintenance issues for the objects, combining the probabilities of damage to the objects to generate the probability of damage to the network device, and combining the maintenance issues for the objects to generate the maintenance issues for the network device.

As further shown in FIG. 5, process 500 may include performing one or more actions based on the probability of damage and/or the maintenance issues (block 560). For example, the device may perform one or more actions based on the probability of damage and/or the maintenance issues, as described above. In some implementations, performing the one or more actions includes one or more of providing the probability of damage and/or the maintenance issues for display, dispatching a technician or an autonomous vehicle to replace or repair the network device, or causing another network device to provide service while the network device is repaired. In some implementations, performing the one or more actions includes one or more of modifying maintenance practices for the network device based on the maintenance issues, modifying vegetation management practices for the network device based on the maintenance issues, or dispatching a technician or an autonomous vehicle to install protective measures for the network device.

In some implementations, performing the one or more actions includes one or more of causing emergency personnel to be dispatched to the network device, or retraining one or more of the object detection and classification model, the geospatial decoder model, or the predictive model based on the probability of damage and/or the maintenance issues. In some implementations, performing the one or more actions includes one or more of repairing damage to the network device, or addressing the maintenance issues for the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, image data identifying images of a network device;
   receiving, by the device, environmental data, historical outage data, performance data, customer data, and historical weather data associated with the network device;
   processing, by the device, the image data, with an object detection and classification model, to identify objects of the network device and to generate classifications for the objects;
   processing, by the device, the objects, the classifications, and the environmental data, with a geospatial decoder model, to determine relationships between an environment of the network device and the objects;
   processing, by the device, the objects, the classifications, the environmental data, the relationships, the historical outage data, the performance data, the customer data, and the historical weather data, with a predictive model, to predict a probability of damage to the network device or maintenance issues for the network device; and
   performing, by the device, one or more actions based on the probability of damage and/or the maintenance issues.

2. The method of claim 1, wherein the device includes one or more of:
   a cloud-based device,
   an unmanned aerial vehicle,
   an autonomous vehicle, or
   a multi-access edge computing device.

3. The method of claim 1, wherein receiving the image data identifying the images of the network device comprises:
   receiving the image data from one or more of:
      an unmanned aerial vehicle,
      a user device,
      a dash camera of a vehicle,
      an image repository, or
      a satellite.

4. The method of claim 1, wherein the object detection and classification model includes a computer vision model.

5. The method of claim 1, wherein processing the image data, with the object detection and classification model, to identify the objects of the network device and to generate the classifications for the objects comprises:
   processing the image data, with the object detection and classification model, to identify attributes associated with the objects;
   generating insights about the objects based on the attributes; and
   providing the insights to the geospatial decoder model along with the objects, the classifications, and the environmental data.

6. The method of claim 1, wherein the relationships between the environment of the network device and the objects include one or more of:
   a relationship between vegetation and the objects,
   a relationship between dimensions of the network device and the objects,
   a relationship between weather conditions and the objects, or
   a relationship between a geolocation of the network device and the objects.

7. The method of claim 1, wherein the geospatial decoder model includes an encoder-decoder convolutional neural network model.

8. A device, comprising:
   one or more processors configured to:
      receive image data identifying images of a network device;
      receive environmental data, historical outage data, performance data, customer data, and historical weather data associated with the network device;
      process the image data, with an object detection and classification model, to identify objects of the network device and to generate classifications for the objects,
         wherein the object detection and classification model includes a computer vision model;
      process the objects, the classifications, and the environmental data, with a geospatial decoder model, to determine relationships between an environment of the network device and the objects;
      process the objects, the classifications, the environmental data, the relationships, the historical outage data, the performance data, the customer data, and the historical weather data, with a predictive model, to predict a probability of damage to the network device or maintenance issues for the network device; and
      perform one or more actions based on the probability of damage and/or the maintenance issues.

9. The device of claim 8, wherein the predictive model includes a clustering machine learning model.

10. The device of claim 8, wherein the one or more processors, to process the objects, the classifications, the environmental data, the relationships, the historical outage data, the performance data, the customer data, and the historical weather data, with the predictive model, to predict the probability of damage to the network device or the maintenance issues for the network device, are configured to:
   process the objects, the classifications, the environmental data, the relationships, the historical outage data, the performance data, the customer data, and the historical weather data, with the predictive model, to predict probabilities of damage to the objects or maintenance issues for the objects;

combine the probabilities of damage to the objects to generate the probability of damage to the network device; and
combine the maintenance issues for the objects to generate the maintenance issues for the network device.

11. The device of claim 8, wherein the one or more processors, to perform the one or more actions, are configured to one or more of:
provide the probability of damage and/or the maintenance issues for display;
dispatch a technician or an autonomous vehicle to replace or repair the network device; or
cause another network device to provide service while the network device is repaired.

12. The device of claim 8, wherein the one or more processors, to perform the one or more actions, are configured to one or more of:
modify maintenance practices for the network device based on the maintenance issues;
modify vegetation management practices for the network device based on the maintenance issues; or
dispatch a technician or an autonomous vehicle to install protective measures for the network device.

13. The device of claim 8, wherein the one or more processors, to perform the one or more actions, are configured to one or more of:
cause emergency personnel to be dispatched to the network device; or
retrain one or more of the object detection and classification model, the geospatial decoder model, or the predictive model based on the probability of damage and/or the maintenance issues.

14. The device of claim 8, wherein the one or more processors, to perform the one or more actions, are configured to one or more of:
repair damage to the network device; or
address the maintenance issues for the network device.

15. A non-transitory computer-readable medium storing a set of instructions, the set of instructions comprising:
one or more instructions that, when executed by one or more processors of a device, cause the device to:
receive image data identifying images of a network device;
receive environmental data, historical outage data, performance data, customer data, and historical weather data associated with the network device;
process the image data, with an object detection and classification model, to identify objects of the network device and to generate classifications for the objects;
process the objects, the classifications, and the environmental data, with a geospatial decoder model, to determine relationships between an environment of the network device and the objects;
process the objects, the classifications, the environmental data, the relationships, the historical outage data, the performance data, the customer data, and the historical weather data, with a predictive model, to predict a probability of damage to the network device or maintenance issues for the network device, wherein the predictive model includes a clustering machine learning model; and
perform one or more actions based on the probability of damage and/or the maintenance issues.

16. The non-transitory computer-readable medium of claim 15, wherein the one or more instructions, that cause the device to process the image data, with the object detection and classification model, to identify the objects of the network device and to generate the classifications for the objects, cause the device to:
process the image data, with the object detection and classification model, to identify attributes associated with the objects;
generate insights about the objects based on the attributes; and
provide the insights to the geospatial decoder model along with the objects, the classifications, and the environmental data.

17. The non-transitory computer-readable medium of claim 15, wherein the one or more instructions, that cause the device to process the objects, the classifications, the environmental data, the relationships, the historical outage data, the performance data, the customer data, and the historical weather data, with the predictive model, to predict the probability of damage to the network device or the maintenance issues for the network device, cause the device to:
process the objects, the classifications, the environmental data, the relationships, the historical outage data, the performance data, the customer data, and the historical weather data, with the predictive model, to predict probabilities of damage to the objects or maintenance issues for the objects;
combine the probabilities of damage to the objects to generate the probability of damage to the network device; and
combine the maintenance issues for the objects to generate the maintenance issues for the network device.

18. The non-transitory computer-readable medium of claim 15, wherein the one or more instructions, that cause the device to perform the one or more actions, cause the device to one or more of:
provide the probability of damage and/or the maintenance issues for display;
dispatch a technician or an autonomous vehicle to replace or repair the network device;
cause another network device to provide service while the network device is repaired; or
modify maintenance practices for the network device based on the maintenance issues.

19. The non-transitory computer-readable medium of claim 15, wherein the one or more instructions, that cause the device to perform the one or more actions, cause the device to one or more of:
modify vegetation management practices for the network device based on the maintenance issues;
dispatch a technician or an autonomous vehicle to install protective measures for the network device; or
cause emergency personnel to be dispatched to the network device.

20. The non-transitory computer-readable medium of claim 15, wherein the one or more instructions, that cause the device to perform the one or more actions, cause the device to one or more of:
retrain one or more of the object detection and classification model, the geospatial decoder model, or the predictive model based on the probability of damage and/or the maintenance issues;
repair damage to the network device; or
address the maintenance issues for the network device.

* * * * *